United States Patent [19]

Hammerle et al.

[11] 4,448,756

[45] May 15, 1984

[54] PROCESS FOR TREATMENT OF EXHAUST GASES

[75] Inventors: Robert H. Hammerle, Franklin; Ching-Hsong Wu, Farmington Hills, both of Mich.

[73] Assignee: Ford Motor Company, Dearborn, Mich.

[21] Appl. No.: 461,819

[22] Filed: Jan. 28, 1983

[51] Int. Cl.$^3$ .................. B01J 23/42; B01J 23/44; B01J 23/46; B01D 53/36
[52] U.S. Cl. .................. 423/213.7; 423/213.5; 502/339
[58] Field of Search .......... 423/213.5, 213.7; 252/472

[56] References Cited

U.S. PATENT DOCUMENTS

| 2,956,865 | 10/1960 | Williams, Sr. | 422/171 |
| 3,180,712 | 4/1965 | Hamblin | 422/171 |
| 3,503,715 | 3/1970 | Haensel | 422/171 |
| 3,896,616 | 7/1975 | Keith et al. | 423/213.7 |
| 4,118,199 | 10/1978 | Völker et al. | 422/171 |
| 4,225,561 | 9/1980 | Torres | 422/171 |

FOREIGN PATENT DOCUMENTS

| 2452717 | 5/1976 | Fed. Rep. of Germany. |
| 2628439 | 1/1977 | Fed. Rep. of Germany. |
| 2555038 | 6/1977 | Fed. Rep. of Germany. |
| 145381 | 11/1975 | Japan | 423/213.5 |
| 3962 | 1/1978 | Japan. |

*Primary Examiner*—Earl C. Thomas
*Assistant Examiner*—Jeffrey E. Russel
*Attorney, Agent, or Firm*—William E. Johnson; Olin B. Johnson

[57] ABSTRACT

This specification discloses a process for treatment of exhaust gases from an internal combustion engine. The process has the following general steps. A hydrocarbon fuel is burned in an internal combustion engine to generate exhaust gases containing various amounts of hydrocarbons, carbon monoxide, and oxides of nitrogen. The generated exhaust gases are passed over an improved catalyst system characterized as follows. The catalyst system has a support medium for supporting the same. The support medium has both an upstream support portion over which exhaust gases initially flow and a downstream support portion over which exhaust gases flow after passing over the upstream support portion thereof. Finely divided palladium is dispersed by itself on the upstream support portion of the support medium. The downstream support portion of the support medium has a platinum/rhodium three-way catalyst thereon.

4 Claims, No Drawings

PROCESS FOR TREATMENT OF EXHAUST GASES

TECHNICAL FIELD

This specification is directed to the teaching of a process for treatment of internal combustion engine exhaust gases. In particular, the process is for treatment of exhaust gases generated by burning a hydrocarbon fuel or a fuel containing hydrocarbons and alcohol blends in an internal combustion engine. Such burning action generates exhaust gases from the internal combustion engine containing various amounts of hydrocarbons, carbon monoxide, and oxides of nitrogen depending upon operating conditions of the internal combustion engine.

BACKGROUND ART AND PRIOR ART STATEMENT

A search conducted in the U.S. Patent Office resulted in the citation of the following patents: U.S. Pat. Nos. 2,956,865; 3,180,712; 3,503,715; 4,118,199; 4,225,561; German Nos. 2,452,717; 2,555,038; 2,628,439; and Japanese No. 1978-3962.

U.S. Pat. No. 2,956,865 discloses a rather complex apparatus for purifying exhaust gases. The structure includes elements which are adapted to add additional fuel to the exhaust gases and structure in which the exhaust gases and additional fuel are burned.

U.S. Pat. No. 3,180,712 discloses a two-stage converter muffler structure. This device has two different catalyst beds which are separated by structure through which auxiliary air may be added to the converter.

U.S. Pat. No. 3,503,715 is directed to an apparatus for treating an exhaust gas stream with different catalyst beds. One catalyst layer comprises platinized alumina particles and the next adjacent layer comprises platinized alumina particles containing a barium, calcium or strontium component.

U.S. Pat. No. 4,118,199 is directed to a monolithic carrier catalyst and arrangements of such a catalyst for the purification of exhaust gases from an internal combustion engine. The structure taught is one in which an increased concentration of catalytically active material is found on the monolithic catalyst carrier. The concentration of the catalytic component increases in the direction of flow of the exhaust gases.

U.S. Pat. No. 4,225,561 is directed to a catalytic converter for transforming gases from one condition to another. The structure disclosed is a rather complex one involving inner and outer canning structure members and means for supporting the same.

German No. 2,452,717 is directed to a catalytic engine exhaust gas treatment system. The system is characterized in that the exhaust gases are first passed through an oxidation catalyst to oxidize part of their hydrocarbons and carbon monoxide content and to reduce their oxygen content to a predetermined amount. Thereafter, the exhaust gases are passed over a reducing catalyst where the nitrogen oxides are reduced. A final catalytic oxidation stage then follows to oxidize any remaining hydrocarbons and carbon monoxide.

German No. 2,555,038 is also directed to a catalytic converter for use with an internal combustion engine. This device includes a twin type structure in which the exhaust gas purifier has a noble metal section followed in the same housing by a non-noble metal section.

German No. 2,628,439 is directed to a catalytic converter structure. The catalytic converter contains a silver or palladium plated grid, the inner parts of which permit expansion in the chamber and absorption of energy of the sound pressure waves in the exhaust gas by forming an artificial turbulence in the gas stream.

Japanese No. 1978-3962 is directed to a catalytic gas purifier for use with internal combustion engines. A primary catalytic unit is used along with an auxiliary catalyst unit which is disposed upstream of the primary catalytic unit.

We are also aware of teachings contained in commonly assigned U.S. patent applications Ser. No. 284,759, now abandoned, entitled "Palladium Catalyst Promoted by Tungsten"; Ser. No. 284,762, now U.S. Pat. No. 4,374,103, entitled "Low Cost Catalyst System"; and Ser. No. 284,763, now U.S. Pat. No. 4,389,382, entitled "Simplified Low Cost Catalyst System", all filed on July 20, 1981.

The Ser. No. 284,759 application teaches a specific catalyst system in which a palladium catalyst is promoted by tungsten. The catalyst system disclosed in that application has highly desirable characteristics in that it is effective in the catalytic oxidation of unburned hydrocarbons and the catalytic reduction of oxides of nitrogen without significant production of ammonia when an internal combustion engine with which it is associated is operated under fuel rich (oxygen deficient) conditions.

The Ser. No. 284,762 catalyst system disclosed is one which teaches a catalyst formulation in which a catalyst substrate is provided with both an upstream catalyst portion and a downstream catalyst portion. The upstream and downstream catalyst portions contain palladium while the downstream catalyst portion additionally contains tungsten.

In the Ser. No. 284,763 application the catalyst formulation is also found on a suitable catalyst substrate having both an upstream catalyst portion and a downstream catalyst portion. The upstream catalyst portion contains finely divided palladium thereon while the downstream portion contains only tungsten thereon.

DISCLOSURE OF THE INVENTION

This invention relates to a process for treatment of exhaust gases from an internal combustion engine. More particularly, this invention relates to a process for treatment of exhaust gases from an internal combustion engine in which the following steps are carried out.

A first step in the process for treating exhaust gases is one of burning a hydrocarbon fuel or a fuel containing hydrocarbons and alcohol blends in the internal combustion engine, thereby to generate exhaust gases from the internal combustion engine. These exhaust gases contain various amounts of hydrocarbons, carbon monoxide, and oxides of nitrogen depending upon the operating conditions of the internal combustion engine.

In the second step of the process for treating exhaust gases, the generated exhaust gases are passed over an improved catalyst system which is characterized in the following manner. The catalyst system includes a support medium. The support medium has both an upstream support portion over which exhaust gases initially flow and a downstream support portion over which exhaust gases flow after passing over the upstream support portion thereof. Finely divided palladium is dispersed by itself on the upstream support portion of the support medium. The palladium is present on the upstream support portion of the support medium in an amount of from about 10 to about 40 grams per cubic foot, preferably at about 20 grams per cubic foot of the upstream support portion of the support medium. The downstream support portion of the support medium has a platinum/rhodium three-way catalyst thereon. The platinum to rhodium ratio of the three-way catalyst is in a range from about 11:1 to about 5:1. The three-way catalyst is present in an amount of from about 10 to about 40 grams per cubic foot, preferably about 20 grams per cubic foot of the downstream support portion of the support medium.

By using the method of this invention, the three-way catalyst material is protected on its downstream support portion by the palladium which is on the upstream support portion of the support medium. The three-way catalyst material is protected from thermal shock and degradation by overheating. This will be discussed in greater detail hereinbelow.

BEST MODE AND INDUSTRIAL APPLICABILITY

The novel features that are considered characteristic of the invention are set forth with particularity in the appended claims. The invention itself, however, both as to its organization and its method of operation, together with additional objects and advantages thereof, will best be understood from the following description of specific embodiments.

The following description is what we consider to be a preferred embodiment of the process of our invention. The following description also sets forth what we now contemplate to be the best mode of fabricating the catalyst system utilized in the process. The description is not intended to be a limitation upon the broader principles of the method of this invention.

As part of the effort to reduce automotive emissions, three-way catalysts (TWC's) were developed to simultaneously convert hydrocarbons, carbon monoxide, and oxides of nitrogen. TWC's are currently used in most U.S. light duty passenger cars and their use is expected to continue for some time.

Platinum and rhodium are the principal active metal components for TWC's. Both of these metals are imported and expensive. Platinum is susceptible to sintering at high temperatures. As an additional matter, rhodium in TWC's is known to interact with alumina washcoat at temperatures above 1650° F. under lean air/fuel ratio conditions to form a catalytically inactive spinel. Therefore, in order to maintain the high TWC activity and thermal resistance, the conventional method of making a TWC is to increase the precious metal loading thereon. As a result, the cost of TWC's can be relatively high.

The process of this invention is one which reduces the cost of a TWC, but does not reduce the catalytic effect thereof. The method of this invention is one which employs the concept that the inlet portion of a catalyst should protect the outlet portion thereof from thermal damage when and if high catalyst temperatures occur. The inlet portion accomplishes the protection by limiting the spacial extent of these temperatures to the inlet catalyst as much as possible, thereby better maintaining the overall catalyst system performance. In addition, the method of this invention is one which does not reduce the catalytic effect thereof if high catalyst temperatures do not occur.

PREPARATION OF CATALYST

In order to demonstrate a best mode for the method of this invention, a catalyst was prepared on a cordierite monolith. The monolith had 400 square channel cells per square inch with a 6 mil wall thickness. This is a standard monolithic catalyst substrate and is available on the commercial market. The catalyst substrate was divided into an upstream portion and a downstream portion, each portion being approximately 3 inches in length. The substrate was divided by sawing it in half.

Finely divided palladium was dispersed by itself on the upstream portion of the support medium in the following manner. The upstream support portion of the support medium was first coated with a gamma alumina washcoat by dipping the monolith in aqueous suspension of gamma alumina, which gamma alumina is also commercially available. The half of the support media was then dried and calcined in air at 600° C. for 4 hours. The finely divided palladium was impregnated on the washcoated catalyst substrate using an aqueous solution of palladium chloride with 4% nitric acid by volume. Thereafter, the upstream support portion of the support medium was dried and calcined in air at 550° C. for 20 hours. The precious metal loading on the upstream support portion of the support medium was in a range of about 20 grams of palladium per cubic foot of the upstream support portion of the support medium.

The downstream support portion of the support medium had gamma alumina placed thereon in a manner identical to that described for the upstream support portion. Thereafter, the platinum/rhodium three-way catalyst was impregnated onto the gamma alumina washcoated downstream support portion of the support medium from a solution containing both chloroplatnic acid and rhodium nitrate. After impregnation the sample was dried and calcined in air for 4 hours at 500° C. This produced a downstream support portion of the support media which had a platinum/rhodium ratio of 11:1 and a precious metal loading of about 20 grams per cubic foot of the downstream support portion of the support medium. The two halves of the support medium were then packaged in a single package with the finely divided palladium being on the upstream portion of the substrate and the platinum/rhodium being on the downstream portion of the support medium. By this it is meant that the exhaust gases flowing into the catalytic converter first flow over the palladium portion and then over the TWC portion. This catalyst was tested against a normal catalyst which would have a precious metal loading of platinum and rhodium of about 20 grams per cubic foot along its entire length, the platinum to rhodium ratio being 11:1.

Engine dynamometer tests were carried out to compare the standard TWC and the catalyst system used with the method of this invention. Both systems had good performance characteristics after high temperature lean spike aging. By this we mean that both catalyst systems were simultaneously exposed to sixty 2000° F. high temperature episodes with 1.5 mole percent excess oxygen for about one minute each on a periodic basis. Interspersed with these episodes, the catalysts were aged for 12,000 miles using the U.S. emission durability cycle. The carbon monoxide and gross NOx conversion characteristics of the two systems were also nearly equal.

The net NOx conversion is one of the major concerns in comparing the standard system to the catalyst system used with the method of this invention because the new catalyst system has less rhodium content and the rhodium is the primary material for accomplishing the net NOx conversion. However, our testing showed that the catalyst system used with the method of our invention suffers only a slight loss of net NOx conversion compared with a standard TWC, indicating that the palladium on the front half of the support media has adequate selectivity for the conversion of NOx to nitrogen.

The hydrocarbon conversion efficiency of the two systems are about the same after the systems have been aged for 12,000 miles on an AMA cycle plus 60 2000° lean-spikes. In addition, both systems had good performance characteristics after 12,000 miles of aging on the U.S. emission durability cycle without high temperature lean spikes. Under this aging the maximum catalyst temperature was 1300° F.

While a particular embodiment of the invention have been illustrated and described, it will be obvious to those skilled in the art that various changes and modifications may be made without departing from the invention, and it is intended to cover in the appended claims all such modifications and equivalents as fall within the true spirit and scope of this invention. For example, the gamma alumina washcoat and precious metal may be placed on the substrate in a single operation instead of separate operations as described above.

We claim:

1. In a process for treatment of exhaust gases from an internal combustion engine, the steps of:
   burning a hydrocarbon fuel or a fuel containing hydrocarbons and alcohol blends in the internal combustion engine thereby to generate exhaust gases from the internal combustion engine containing various amounts of unburned hydrocarbons, carbon monoxide, and oxides of nitrogen depending upon operating conditions of the internal combustion engine; and
   passing said generated exhaust gases over an improved catalyst system, characterized by;
   a support medium for supporting a catalyst system, said support medium having both an upstream support portion over which exhaust gases initially flow and a downstream support portion over which exhaust gases flow after passing over said upstream support portion thereof;
   finely divided palladium dispersed by itself on said upstream support portion of said support medium, said palladium being present in an amount of from about 10 to 40 grams per cubic foot of said upstream support portion of said support medium;
   said downstream support portion of said support medium having a platinum/rhodium three-way catalyst thereon, said platinum to rhodium ratio being from about 11:1 to about 5:1 with said three-way catalyst material being present in an amount of from about 10 to 40 grams per cubic foot of said downstream support portion of said support medium.

2. The process of claim 1, in which the volumes of said upstream support portion and said downstream support portion of said support medium are equal.

3. In a process for treatment of exhaust gases from an internal combustion engine, the steps of:
   burning a hydrocarbon fuel or a fuel containing hydrocarbons and alcohol blends in the internal combustion engine thereby to generate exhaust gases from the internal combustion engine containing various amounts of unburned hydrocarbons, carbon monoxide, and oxides of nitrogen depending upon operating conditions of the internal combustion engine; and
   passing said generated exhaust gases over an improved catalyst system, characterized by;
   a support medium for supporting a catalyst system, said support medium having both an upstream support portion over which exhaust gases initially flow and a downstream support portion over which exhaust gases flow after passing over said upstream support portion thereof;
   finely divided palladium dispersed by itself on said upstream support portion of said support medium, said palladium being present in an amount of about 20 grams per cubic foot of said upstream support portion of said support medium;
   said downstream support portion of said support medium having a platinum/rhodium three-way catalyst thereon, said platinum to rhodium ratio being 11:1 with said three-way catalyst material being present in an amount of about 20 grams per cubic foot of said downstream support portion of said support medium.

4. The process of claim 2, in which the volumes of said upstream support portion and said downstream support portion of said support medium are equal.

* * * * *